UNITED STATES PATENT OFFICE 2,569,428

BIS-OXAZOLINES

Stanley P. Rowland, Philadelphia, Pa., assignor to Rohm & Haas Company, Philadelphia, Pa., a corporation of Delaware No Drawing. Application July 22, 1950, Serial No. 175,481

2 Claims. (Cl. 260—307)

This invention relates to bis-oxazolines and to a process for their manufacture. More particularly, it relates to bis-oxazolines which have the general formula

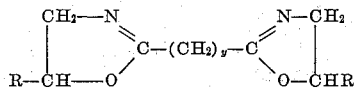

in which $y$ is an integer of value 4 to 8 inclusive and R is a phenyl group or an alkyl group containing 1 to 16 carbon atoms.

These bis-oxazolines are made by reacting, under conditions which are discussed in detail below, certain dicarboxylic acids, having the formula $HOOC-(CH_2)_y-COOH$ in which $y$ is an integer of value 4 to 8, with certain aminoalcohols, or alkanolamines, having the formula $HO-CH(R)CH_2-NH_2$ in which R is a phenyl group or an alkyl group containing 1 to 16 carbon atoms. The reaction takes the following course:

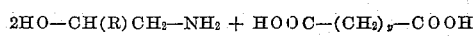

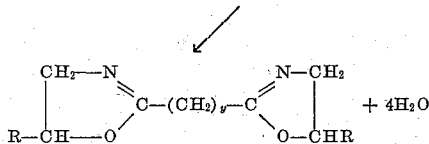

The reaction which is involved may be more conveniently understood from the following typical reaction between sebacic acid and isopropanolamine:

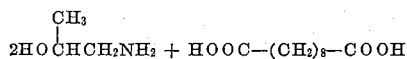

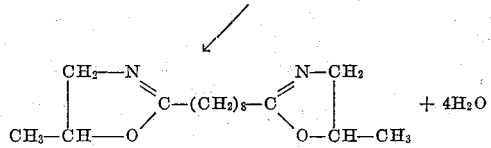

The acids which have been used to prepare the bis-oxazolines are adipic, pimelic, suberic, azelaic, and sebacic acids.

The aminoalcohols, or alkanolamines, which can be employed are those in which the amino and hydroxyl groups are separated by two carbon atoms and in which the carbon atom adjacent the hydroxyl group also carries a phenyl or alkyl substituent which is represented by R in the above general formulas. While it is preferred that the substituent alkyl group be a methyl group, as in isopropanolamine $CH_3CHOHCH_2NH_2$, I have found that any straight chain or branched chain alkyl group containing up to 16 carbon atoms can be present. Thus, the alkyl substituents which are represented by R are typified by the following groups: Methyl, ethyl, n-propyl, iso-propyl, n-butyl, iso-butyl, tert.-butyl, iso-octyl, lauryl, and hexadecyl groups and any isomers of the foregoing. It is to be noted that ethanolamine is excluded—for the very good reason that it forms alkyd-type resins with the dicarboxylic acids under the conditions which are employed herein to make the bis-oxazolines. It is also to be noted that in the process of this invention the hydrocarbon group represented by R remains intact and appears in the final bis-oxazoline as the same substituent on the carbon atom adjacent the oxygen atom in the oxazoline heterocycle,

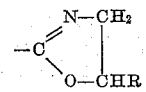

Since only the hydroxyl, amino, and carboxyl groups react during the process of this invention, the procedure of the examples below is followed regardless of the particular hydrocarbon substituent, R, which may be present.

It is evident from the equations above that the aminoalcohol and the dicarboxylic acid react in the ratio of two moles of the former to one mole of the latter and it is, therefore, of prime importance that at least two moles of aminoalcohol always be present for each mole of acid in order to assure high yields of the bis-oxazoline. Ratios of aminoalcohol to acid lower than two-to-one encourage the formation of resinous polyesters which, of course, are not desired here. An excess of the aminoalcohol is helpful in assuring complete and efficient reaction of the dicarboxylic acid and is favored. The unreacted aminoalcohol serves also as a solvent and is easily removed from the product as, for example, by distillation.

The mixture of aminoalcohol and discarboxylic acid is heated at first to the temperature at which water of reaction is liberated. At atmospheric pressure this point is approximately 150° C. It appears that at temperatures between about 150° and 200° C. an intermediate amide is formed. At the same time that the water is liberated the aminoalcohol will vaporize, or it may even boil if it is of low molecular weight like isopropanolamine. Therefore, it is recommended that means, such as a steam-heated condenser or fractionating column, be used so that the water which is formed in the reaction is removed while the aminoalcohol is returned to the reaction mixture.

Heating is continued and the temperature is raised to at least 225° C. and preferably within the range of 250° to 300° C. Heating to a temperature about 225° C. is essential to the satisfactory production of bis-oxazolines. The progress of the reaction is followed by measuring the amount of water of reaction which is removed. Thereafter any excess aminoalcohol is removed, preferably by distillation, leaving the bis-oxazoline product which can be subsequently purified by distillation, for example, under reduced pressure.

It is apparent to one skilled in the art that variations in the described procedure can be made without departing from the spirit of this invention, which is one of reacting, with the liberation of water, two moles of an aminoalcohol, as described, with one mole of dicarboxylic acid, as described, at a temperature above 225° C., and preferably from 250° C. to 300° C. What is essential for the successful production of bis-oxazolines is that only the particular aminoalcohols be used which are described, that the aminoalcohol and acid be reacted in the ratio of two moles of the former to one of the latter, and that the temperature of reaction be in the range of 225° C.—or preferably 250° C.—to 300° C. Only by observing these limitations is the formation of resins on the one hand and amides on the other prevented.

The following examples serve to illustrate how the products of this invention are made.

Example 1

A mixture of 1.5 moles (219 grams) of adipic acid and 4.5 moles (338 grams) of isopropanolamine was placed in a one-liter, three-necked flask equipped with agitator, thermometer, inlet for gas, and a reflux condenser heated with steam and to the top of which was attached a take-off tube which led to an ice-cooled receiver. The mixture in the flask was stirred and heated to a temperature of 150° C. at which point water began to distill. Throughout the reaction a blanket of nitrogen was maintained over the reaction mixture. Over a period of four hours the temperature was gradually raised to 197° C. and during this time 95.5 grams of distillate was removed. The distillate contained approximately three moles of water together with isopropanolamine. The reflux condenser was then removed and replaced by the conventional type of condenser and the reaction mixture was heated gradually to 235° C. over a period of 11.5 hours. During this heating period 112.5 grams of a mixture of water and isopropanolamine was removed by distillation making a total of 208 grams of water and aminoalcohol which was distilled from the reaction mixture. The fluid reaction mixture was then distilled under a pressure of one millimeter and a 74% yield of tetramethylene-bis(5-methyloxazoline) was obtained. Its composition was confirmed by analysis. The purified product boiled at 130°–140° C./1 mm. and had an index of refraction of 1.4796 at 20° C.

Example 2

By the same procedure described in Example 1, three moles (564 grams) of azelaic acid and 12 moles (900 grams) of isopropanolamine were mixed and heated to 192° C. over a period of six hours during which 347 grams of distilled water and isopropanolamine were removed. Heating was continued for 6.5 additional hours during which the temperature rose steadily from 192° C. to 272° C., and during which the excess isopropanolamine and more water was removed by distillation. The fluid residue was then distilled under reduced pressure and the distillate was redistilled at a pressure of one millimeter. A 48% yield of heptamethylene-bis(5-methyloxazoline) was obtained (B. P.=180–185° C./1 mm.; $n_D^{20}$=1.4785; N$_2$ analysis: 10.7% found, 10.5% calculated; acid No.=0).

Example 3

By the same procedure, a mixture of 1.5 moles (302 grams) of sebacic acid and 4.5 moles (338 grams) of isopropanolamine was reacted. In the first one and one-half hours, a total of 97.2 grams of distillate was removed up to a temperature of 183° C. Thereafter, the excess isopropanolamine and more water were removed by distillation while the temperature rose to 254° C. over a period of seven and one-half hours. A 60% yield of octamethylene-bis(5-methyloxazoline) was obtained. This product, the composition of which was confirmed by analysis, had the following constants: B. P.=185°–195° C./1 mm.; acid No.=0; N$_2$=9.9% (calculated=10.0%); $n_D^{20}$=1.4784.

The same general procedure which is shown in the examples was used in the preparation of other bis-oxazolines which differed only as regards the substituent represented by R in the general formulas given above. In all cases some water was liberated in the temperature range of 150°–180° C. presumably as the hydroxyamide of the dicarboxylic acid was first formed. Then as the temperature was raised above 225° C., more water was liberated as the bis-oxazoline formed.

The products of this invention are new compounds and they are particularly valuable in the preparation of distinctive imido-esters and novel resinous products as detailed in some of my applications for Letters Patent including Serial Nos. 135,821, filed December 29, 1949; 135,543, filed December 28, 1949; 136,647, filed January 3, 1950; 136,134, now Patent No. 2,543,602, filed December 30, 1949; and 148,515, now Patent No. 2,547,498, filed March 8, 1950.

I claim:

1. Bis-oxazolines having the general formula

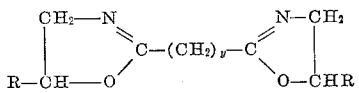

in which $y$ is an integer of value 4 to 8 inclusive and R is a monovalent hydrocarbon group from the class consisting of a phenyl group and alkyl groups containing one to sixteen carbon atoms.

2. Bis-oxazolines having the general formula

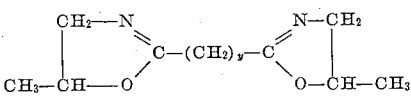

in which $y$ is an integer of value 4 to 8 inclusive.

STANLEY P. ROWLAND.

No references cited.